INVENTORS
PAUL ALLIOT
DANIEL DENOIT
BY
Bacon & Thomas
ATTORNEYS

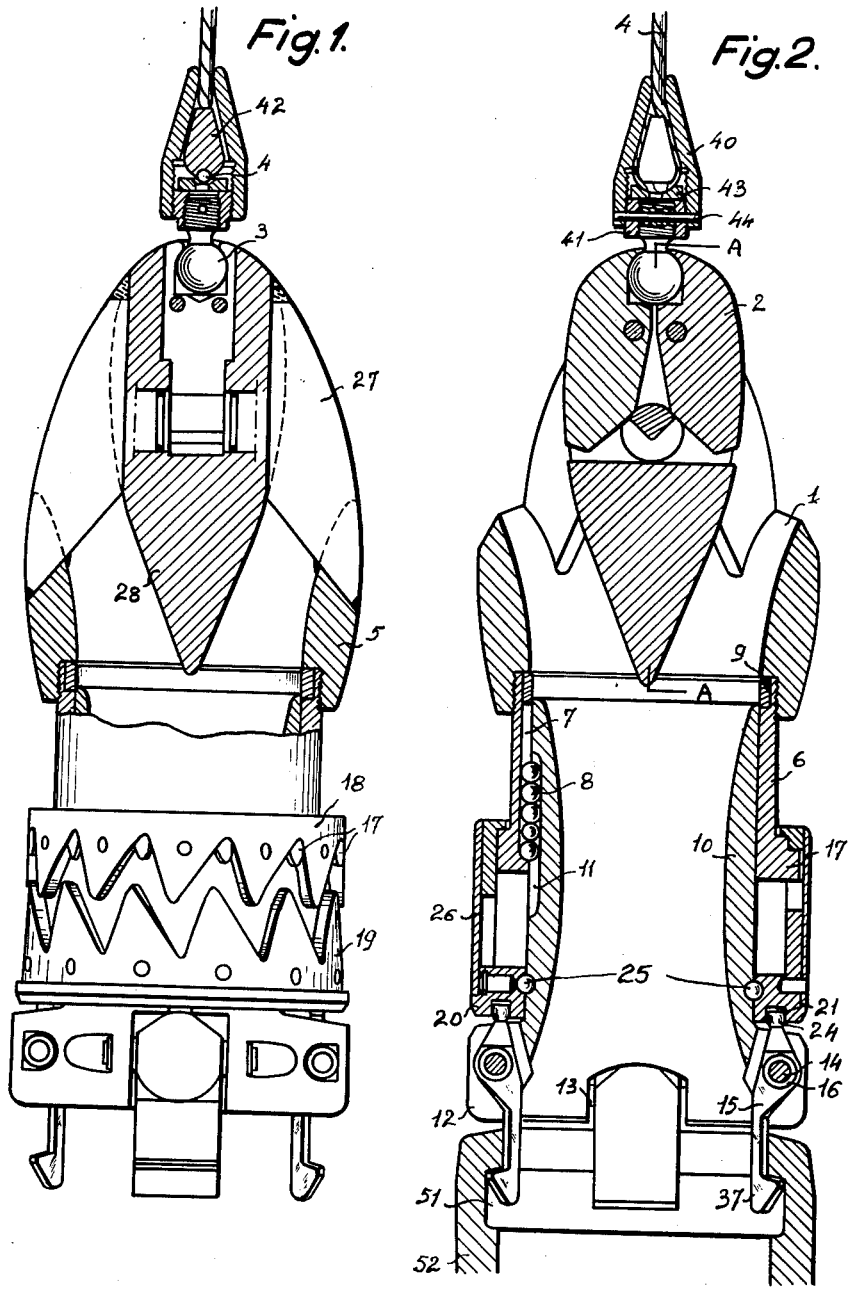

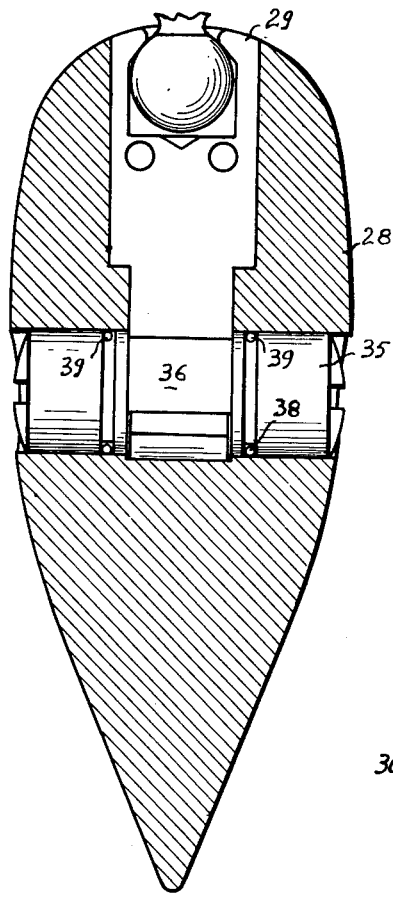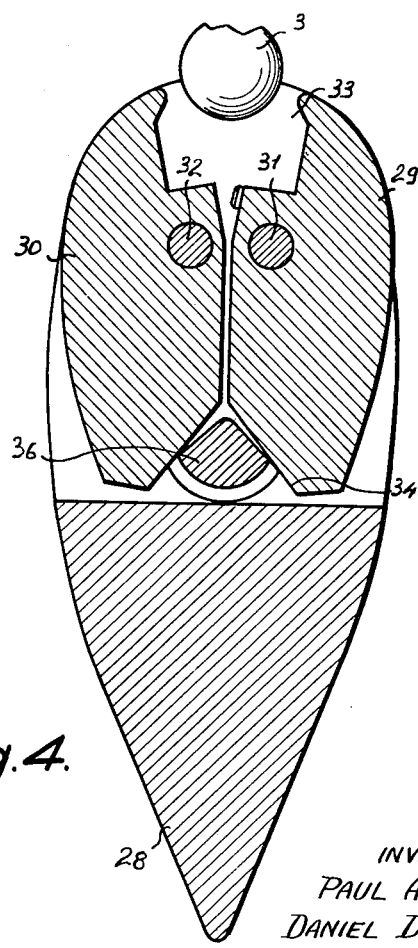

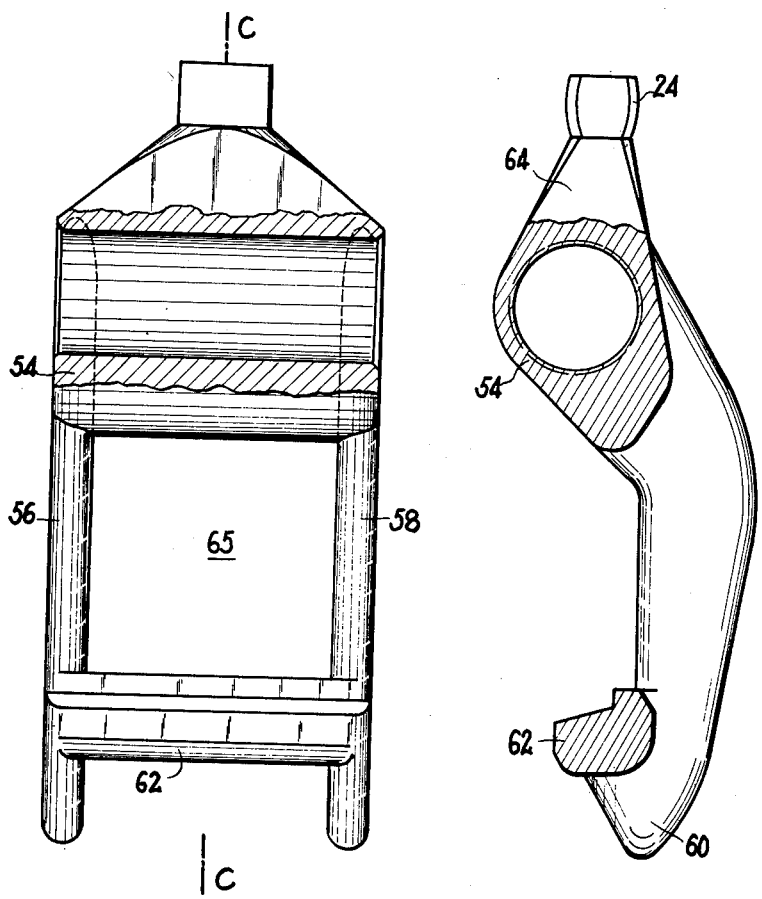

United States Patent Office 3,199,911
Patented Aug. 10, 1965

3,199,911
MANIPULATOR FOR LOADING MACHINE
Paul Alliot and Daniel Denoit, Paris, France, assignors to Electricite de France (Service National), Paris, France
Filed Sept. 5, 1962, Ser. No. 221,503
Claims priority, application France, Sept. 18, 1961, 873,425
8 Claims. (Cl. 294—95)

The present invention relates to a manipulator for loading machines which is more especially intended for the handling of fuel elements of nuclear reactors.

This manipulation is usually carried out by means of automatic lifting tongs or grippers operated by a cable and designed to grab the loads to be shifted, to transport these latter and to release them when they have been placed in position. In these lifting tongs, the load is gripped during transportation due to the action of the weight of said load whereas the release of the load is produced by the elimination of said action when the load bears on the support which is chosen. While the operation of this system is very simple, it has the substantial disadvantage of causing the load to be released as soon as the weight of this latter is no longer effective and, in particular, as soon as the load meets an obstacle on its path, which is a frequent occurrence.

Moreover, the use of a manipulator of this type in gas-cooled nuclear reactors creates the problem of interruption of gas flow which is always liable to be dangerous.

The purpose of the present invention is to produce a manipulator which provides a remedy for the above-mentioned disadvantages by locking the load which is released only after a pre-determined number of contacts on a bearing surface and by permitting a continuous gas flow to take place. This manipulator has the further advantage of being fitted with a device for the attachment of the control cable by means of which this latter can be rapidly and readily replaced.

The invention has for its object a loading machine manipulator which is characterized in that it comprises a head fixed on the general control unit, a cylindrical member located inside the head and on which said head is freely mounted to perform movements of translation, claws designed to grip the load and pivotally mounted on said cylindrical member, a cam designed to control the pivotal movement of said claws for the purpose of gripping and releasing the load, said cam being provided with an annular groove having eccentric portions uniformly spaced apart and working in conjunction with one of the ends of the load-gripping claws, and means for driving the operating cam in rotation in dependence on the longitudinal movements of the head with respect to said cylindrical member.

In accordance with a preferred form of embodiment, the rotary drive means consist of a double annular cam with saw-tooth profiles which is integral with the groove-type cam, the profiles of said double annular cam being adapted to work in conjunction with studs which are integral with the manipulator head, each longitudinal movement of the head and consequently of the studs producing a corresponding unitary angular movement of the cams about the axis thereof.

Further characteristic features and advantages will in any case be brought out from the detail description which follows below, reference being made to one example of construction, which is not given in any sense by way of limitation, of a loading machine manipulator in accordance with the invention as illustrated in the accompanying drawings:

FIG. 1 is a view of the manipulator in accordance with the invention, shown partly in longitudinal cross-section and partly in elevation with a portion broken away.

FIG. 2 illustrates the same manipulator as shown in FIG. 1 in longitudinal cross-section, and fitted with its load.

FIG. 3 illustrates on a larger scale in cross-section taken along the line A—A of FIG. 2 the clamp which is designed to hold the control cable.

FIG. 4 illustrates on a larger scale the clamp which is designed to hold the control cable and which is shown in the open position.

FIG. 7 is a front view of a gripping claw in accordance with an alternative form of embodiment of the invention.

FIG. 8 is a view in axial cross-section taken along the line C—C of FIG. 7.

Figure 5:
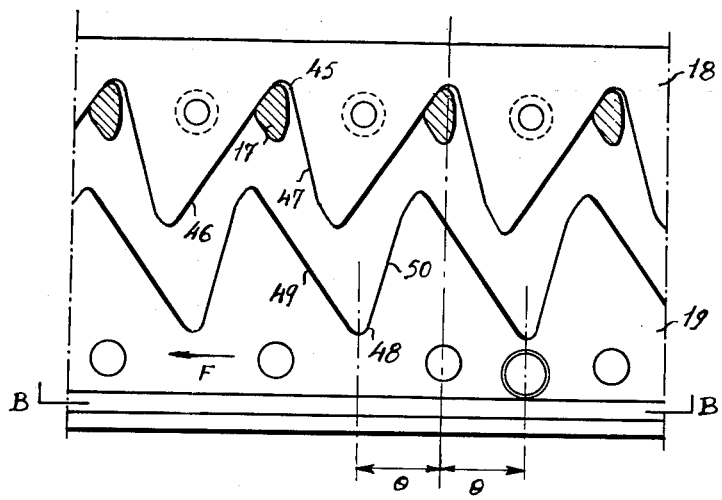
FIG. 5 illustrates the developed surfaces of the cams of FIG. 1.

The manipulator as illustrated in FIGS. 1 and 2 is provided with a head 1 in which is fixed by means of a clamp 2 a knuckle 3 which is coupled to a control cable 4, the said control cable being operated by means of a winch which has not been illustrated in the drawings.

The bottom portion of the above-mentioned head 1 has the shape of a ring 5 and extends downwards in a cylindrical sleeve 6 which is screwed into said ring 5, said cylindrical sleeve being provided with axial grooves 7 of semi-circular section which form a raceway for balls 8. A ring 9, which is locked in position inside a top recess of the sleeve 6 effectively prevents the balls 8 from escaping upwards.

A second cylindrical sleeve 10 which is fitted inside the sleeve 6 is also provided with axial grooves 11 in which the balls 8 are housed, thereby permitting the two sleeves to slide with respect to each other while being made fast for rotation. The sleeve 10 has an extension at the bottom portion thereof in the form of a cylinder 12 which has a larger diameter and in which are formed recesses 13, for example four in number, there being fixed inside each recess a pin 14 which serves as a pivotal attachment, through the intermediary of a ring 16 of self-lubricating sintered metal or any like material, to a claw 15 which terminates in a locking catch 37.

Figure 6:
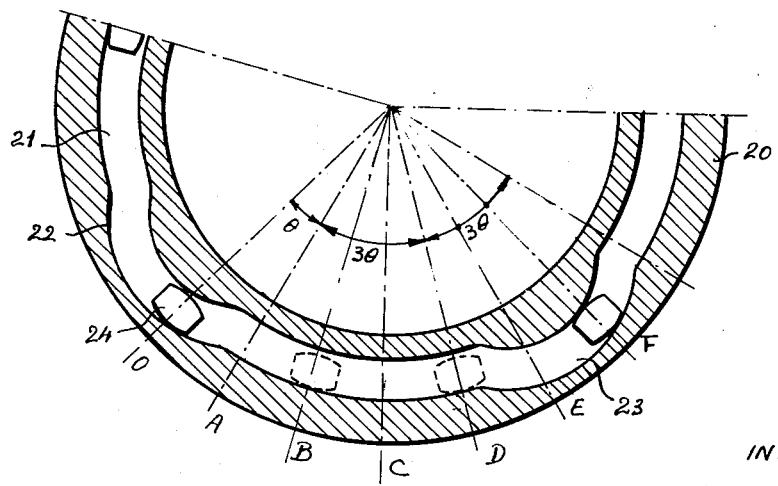
FIG. 6 is a cross-section taken along the line B—B of FIG. 5.

The bottom portion of the cylinder 6 is fitted with studs 17 which are twelve in number, for example, and which are moved into position inside the teeth or gullets of an upper saw-toothed annular cam 18 when the head 1 is raised with respect to the sleeve 10. A lower saw-tooth cam 19 is mounted beneath the upper cam in such manner that its teeth are directed towards the teeth of the cam 18 and are slightly displaced with respect to this latter. A cylindrical casing 26, which has not been illustrated in FIG. 1, is fitted round these two cams 18 and 19 and securely holds them together to form an annular cam member having a cam driving surface thereon. The cam 19 is additionally provided with a circular bead 20 in which is cut an annular groove 21 forming an actuating cam surface (as shown in FIG. 6). The semi-spherical heads 24 of the pivotally mounted claws 15 are housed inside the groove 21, this latter having substantially the shape of a ring which is concentric with the bead 20 and comprising eccentric portions 22, 23 of smaller diameter and uniformly spaced apart. The groove thus has a succession of identical portions composed of a concentric profile and an eccentric profile, the number of these portions being equal to that of the claws.

In the form of embodiment of FIG. 6, the eccentric portions are four in number and are separated by four identical and concentric portions so arranged that three movements of rotation of the cam through an angle θ are necessary in order that each head 24 can be caused to pass through each eccentric portion of the groove and three movements of rotation through the same angle θ are necessary in order to permit each head to pass from one end to the other of each portion of the groove which is concentric with the cam.

The sleeve 10 is pierced above the claws 15 with a circular groove in which are housed balls 25, the said balls being also housed in a corresponding groove of the cam 19 for rotatably mounting the integral driving and actuating cam surfaces on the sleeve 10.

In accordance with a preferred form of embodiment illustrated in FIGS. 7 and 8, each claw 15 is constituted by a bored part 54 which is fitted on the pivot-pin 14. The said part 54 is extended by two shaped side-plates 56 and 58 respectively, the bottom ends of which form the heels 60 of the claw and are joined together by means of a spacer 62 which is designed to bear against the load. The said spacer 62 accordingly delimits with the side-plates 56 and 58 and the bottom portion of the part 54 a free space 65 in which there can circulate a fluid which flows through the channel to be supplied and especially a fluid for cooling the fuel elements to be manipulated. This fluid can also be readily caused to pass through the entire manipulator by flowing through the interior of the sleeve 10 and the ring 5 of the head 1. At that end thereof which is located opposite to the space 65, the part 54 has the shape of a cone frustum 64, and the small base of this latter carries the head 24 which works in conjunction with the annular groove 21.

The head 1 of the manipulator is formed by the ring 5 which is joined by four ribs 27 to a central element 28 in the shape of a rain-drop. The top portion of said rain-drop 28 (as shown in FIGS. 3 and 4) is hollowed-out and carries a clamp 2 which is designed to grip the knuckle joint 3 which is coupled to the control cable 4. The said clamp 2 has two jaws 29–30 which are pivotally mounted about pins 31–32 respectively, the top portion of said jaws being hollowed-out at 33 so as to form a housing for the knuckle joint 3, whilst the lower portion of said jaws bears by means of a sloping surface 34 on a shaft 35 which is fitted in a transverse bore of the element 28 in parallel relation to the pins 31 and 32. The central portion of the shaft 35 is hollowed-out so as to form a wedge 36 against which the sloping surfaces 34 are brought to bear and the movement of rotation of which permits the opening movement of the clamp to take place (as shown in FIG. 4). On each side of said hollowed-out portion, there is formed in the shaft 35 a circular groove 38 inside which is fitted a retainer or snap-ring 39 which ensures that the shaft 35 is locked for rotation. The said shaft also terminates at each end in a grooved screw-head which permits the shaft to be actuated by means of a screwdriver or like tool.

The knuckle-joint 3 is made integral with the cable 4 by means of a frusto-conical socket 40 in which it is secured by means of a threaded nut 41. An olive 42 having a peripheral groove of semi-circular section inside which is engaged the cable 4 is gripped inside the socket 40 by means of the nut 41 with interposition of a washer 43. The combined assembly is locked by means of a pin 44.

As shown in the drawing, in order to change the cable, it is merely necessary to cause the shaft 35 to rotate through an angle of 180° in order to bring said shaft from the position shown in FIGS. 2 and 3 to that of FIG. 4. This movement of rotation of the shaft 35 results in the pivotal movement of the jaws 29 and 30 about their pins 31, 32 and frees the knuckle joint 3 which is no longer gripped inside the recess 33.

Another cable fitted with a knuckle attachment can then be placed in position. A further rotation of the shaft 35 through an angle of 180° will cause the two jaws 29–30 to swing over and thus to revert to the position of closure of FIG. 3.

This replacement of the cable can be carried out even when the manipulator is located in a closed chamber, in which case it is merely necessary to provide for a hole through which a screwdriver can be inserted.

When the cable 4 is thus held inside the socket 40 and the knuckle 3 is in position inside the recess 33, the winch can be operated with a view to setting the manipulator to work.

The position of the cams 18 and 19 and consequently of the groove 21 is so adjusted that the heads 24 of the claws 15 are located in the eccentric portions 22, 23 at a point such as that designated by the reference O in FIG. 6 and that consequently, the claws 15 are open with their bottom extremities or heels 37 located close together. The studs 17 are then in position at the top portion 45 of the teeth of cam 18, as shown in FIG. 5.

The unwinding of the cable 4 progressively draws the manipulator nearer to the load until the moment when the lower cylinder 12 of the sleeve 10 comes into contact with this latter and is accordingly immobilized. As the head of the unit continues to move downwards, the sleeve 6 slides down the sleeve 10 and the studs 17, moving vertically, leave the bottom 45 of the teeth or gullets of the cam 18 and come into contact with the sloping faces 49 of the saw teeth 19. As the vertical movement of said studs continues, those latter push the cam 19 and consequently the cam 18 and the casing 26 and cause them to rotate in the direction of the arrow F until the moment when they are in position 48 at the bottom of the teeth or gullets of the cam 19.

The rotation of the cam 19 has produced the rotation of the groove 21 though the same angle θ and the heads 24 of the claws 15 have left the eccentric portion 22 so as to reach the point A of that portion which is concentric with the cam. This displacement has resulted in the pivotal movement of the claws 15 about their pins 14 in such manner as to cause said claws to penetrate inside a groove 51 of the load 52 which they are intended to handle (as shown in FIG. 2). The said groove 51 has preferably a frusto-conical top face so as to ensure that the heels 37 of the claws are correctly applied even if the manipulator makes a certain angle with the load.

In order to lift the load, the cable 4 is rewound, the studs 17 are drawn upwards, thereby coming into contact with the sloping faces 46 of the cam 18, thereby pushing this latter in the direction of the arrow F until the time when said studs reach the bottom 45 of the teeth or gullets of said cam 18. The studs accordingly produce a further movement of rotation of the cams through an angle θ which in the form of embodiment illustrated is an angle of 15°, the cams having 12 teeth and the studs 17 being twelve in number; the heads 24 pass through the corresponding portion AB of the groove 21 which is concentric with the manipulator and the claws 15 remain in their position of closure. As the cable continues to be wound, the studs 17 draw the cams 18, 19 upwards with their casing 26 as well as the sleeve 10, the claws 15 and the load 52.

If in the course of its travel, the load 52 strikes against any obstacle, the sleeve 10 bears on the load 52 and slides inside the sleeve 6 by virtue of the balls 8 and the grooves 7 and 11. The studs 17 come into abutment with the sloping faces 49 of the cam 19 which is pushed in the direction of the arrow F, thereby producing the rotation of the cams 18 and 19 and consequently the rotation of the groove 21 about the heads 24 which accordingly travel over the distance BC. Since this portion of the groove is concentric with the bead 20, however, the claws 15 are held in their position of closure and the load is not liable to be released.

In order to free the load from the obstacle which has impeded its progress, the cable is wound-in over a short distance. The studs 17 are drawn upwards and leave the teeth 48 of the cam 19 so as to penetrate inside the teeth 45 of the cam 18. The groove 21 moves once again through an angle θ which accordingly brings the point D of the ring opposite the heads 24. The position of the claws 15 is therefore not modified and the movement of the manipulator is accompanied by that of the load.

A further unwinding of the control cable 4 conveys the load to the position in which it is intended to be released. At the time of setting the load in position, the movement which occurs when the load meets with an obstacle is again repeated and the longitudinal displacement of the studs 17 causes the rotation of the cams 18 and 19 and of the groove 21 through an angle θ. However, the heads 24 which were in the position corresponding to the point D adjacent to the eccentric portion 23 are drawn away by this latter up to the point E and the claws 15 pivot about their pins 22 and release the load 52.

The empty manipulator is then lifted again, the studs 17 accordingly move from the teeth 48 to the teeth 45 and the groove 21 rotates through a further angle θ which brings the point F opposite the heads 24. Since the point F still forms part of the eccentric portion 23, however, the claws 15 remain open and the manipulator is in a position which is identical to the starting position when the point O was located opposite the heads 24. The device is consequently ready to handle another load.

As in the previous case, two contacts and one supporting point will be necessary in order to free this new load, the groove 21 being provided with four portions OF which are identical. This accordingly avoids any danger of accidental dropping of the load which otherwise occurs fairly frequently when this latter is freed under the action of its own weight, simply due to the release of the cable which is caused by contact with a supporting surface of any kind.

In the case in which no obstacle is encountered, a simple operation permits the whole unit to be slightly lifted and then lowered again in order to produce the two successive contacts which are necessary for the rotation of the cams and the opening of the claws 15.

In the form of embodiment which has just been described, the eccentric portions of the groove 21 are spaced apart at a distance which corresponds to three successive steps of rotation of the cams through the angle θ; in other words, between the time of opening and closing of the claws 15, the studs 17 perform one downward movement and two upward movements without thereby modifying the position of said claws, and similarly, the cam performs three successive movements of rotation through an angle θ between the moment when the claws commence to open and the moment when they are fully closed again.

It would nevertheless be possible to contemplate without thereby departing from the scope of the invention any other distance between the eccentric portions and any other ratio between the longitudinal displacements of the studs and the pivotal movements of the claws in such manner as to provide against any encounter with a different number of obstacles.

The sleeve 10 is externally cylindrical but has an internal profile which is adapted to correspond to that of the manipulator in such manner as to guide the gas flow when the manipulator moves inside a gas-cooled channel. Similarly, the annular space which is formed between the ring 5 and the central element 28 of the head 1 provides a passageway for the gas flow. The shape of the ribs 27 is also designed with a view to facilitating said gas flow.

Moreover the said gas circulation is further improved by the use of the claws of FIGS. 7 and 8 by virtue of the free space provided between the sideplates 56, 58 and the spacer 62. Even when said claws are close together after releasing the load, the clamp is intended to move inside a channel and to cause only the minimum disturbance to the flow of cooling fluid.

What we claim is:

1. A manipulator for a loading machine, comprising: a head, a member mounted inside said head for sliding movement longitudinally thereof; a plurality of concentrically arranged claws designed to grip a load pivotally mounted intermediate the opposite ends thereof on said member; an annular cam member having first and second cam surfaces thereon rotatably mounted on said member for longitudinal movement therewith, and designed to control pivotal movement of said claws, one of the extremities of said claws being continually maintained in operative engagement with one of said cam surfaces, said one cam surface being generally concentric with said claws and including a plurality of spaced apart eccentric portions, said other cam surface including a pair of opposed, saw-tooth camming tracks arranged concentrically with said one cam surface, the camming teeth on one of said tracks being staggered in relation to the teeth on the other of said tracks; and rigid finger means integral with said head and extending between said opposed camming tracks for cooperation therewith, whereby longitudinal movement of said head with respect to said member resulting in said finger means alternately engaging said pair of saw-tooth camming tracks which results in step by step rotation of said annular cam member and successive opening of said claws and locking them in open position and in closing said claws and locking them in closed position.

2. A manipulator for a loading machine, comprising: a head; a cylindrical member mounted inside said head for sliding movement longitudinally thereof; a plurality of uniformly spaced apart and concentrically arranged claws designed to grip a load pivotally mounted intermediate the opposite ends thereof on said member; an annular cam member having first and second cam surfaces thereon rotatably mounted on said member for longitudinal movement therewith, and designed to control pivotal movement of said claws, one of said cam surfaces including an annular groove formed therein with one of the extremities of said claws being continually maintained in operative engagement with said cam groove, said annular cam groove being generally concentric with said claws and including a plurality of uniformly spaced apart eccentric portions, the other of said cam surfaces including a pair of opposed, saw-tooth camming tracks arranged concentrically with said one cam surface, the camming teeth on one of said tracks being staggered in relation to the teeth on the other of said tracks; and rigid finger means integral with said head and extending between said opposed camming tracks for cooperation therewith, whereby longitudinal movement of said head with respect to said member resulting in said finger means alternately engaging said pair of saw-tooth camming tracks which results in step by step rotation of said annular cam member and successive opening of said claws and locking them in open position and in closing said claws and locking them in closed position.

3. A manipulator in accordance with claim 2, characterized in that the groove of the cam member has a succession of identical portions equal in number to that of the claws.

4. A manipulator in accordance with claim 3, characterized in that each of the portions of the groove has a profile which is concentric with the cam member followed by an eccentric profile, each profile corresponding to three unitary angular movements of the cam member, the movements of said cam member with respect to each claw holding said claw in the gripping position in the three successive angular displacements of the concentric profile and the withdrawal of the claw in the position in which the load is released, the maintenance of said claw in the withdrawal position and the return of said claw to the gripping position in the first, second and third, respectively, successive angular displacements of the eccentric profile.

5. A manipulator in accordance with claim 4, characterized in that the first and third unitary angular displacements of the eccentric profile correspond to downward movements of the head with respect to the cylindrical member of said manipulator.

6. A manipulator in accordance with claim 2, characterized in that said head is formed with longitudinal passage means extending therethrough and the cylindrical member is constituted by a sleeve having a sliding fit in said passage means and providing open communication through said manipulator from one end to the other end thereof.

7. A manipulator in accordance with claim 2, characterized in that each gripping claw is provided with a fixed support in the pivotal axis thereof, two side-plates integral with said support, a spacer on which the load bears being fixed on said two side-plates, and a head designed to work conjointly with the annular groove of the cam member, said head being integral with said support.

8. A manipulator in accordance with claim 1, characterized in that the head of said manipulator is provided with a pivoted clamp pivotally mounted intermediate the opposite ends thereof on said head for gripping a cable-attachment device and a rotatable member mounted on said head adjacent said clamp and engageable with the inner end of said clamp for pivoting said clamp from open to closed position and for maintaining said clamp in said closed position.

References Cited by the Examiner

UNITED STATES PATENTS

| 909,352 | 1/09 | Wheeler | 294—116 X |
| 913,589 | 2/09 | Vowell | 294—82 |
| 1,506,827 | 9/24 | Gellert | 294—106 |

FOREIGN PATENTS

| 1,230,027 | 1960 | France. |

HUGO O. SCHULZ, *Primary Examiner.*

JAMES S. SHANK, ERNEST A. FALLER, *Examiners.*